Aug. 8, 1950 G. C. SZIKLAI 2,517,808

IMAGE RECORDING AND REPRODUCING APPARATUS

Filed Dec. 22, 1948 2 Sheets-Sheet 1

INVENTOR
George C. Sziklai
BY
[signature]
ATTORNEY

Aug. 8, 1950 G. C. SZIKLAI 2,517,808

IMAGE RECORDING AND REPRODUCING APPARATUS

Filed Dec. 22, 1948 2 Sheets-Sheet 2

INVENTOR
George C. Sziklai
BY
[signature]
ATTORNEY

Patented Aug. 8, 1950

2,517,808

UNITED STATES PATENT OFFICE 2,517,808

IMAGE RECORDING AND REPRODUCING APPARATUS

George C. Sziklai, Princeton, N. J., assignor to Radio Corporation of America, a corporation of Delaware Application December 22, 1948, Serial No. 66,748

10 Claims. (Cl. 178—6.6)

The present invention relates to apparatus for providing a record of image signals which may be later employed for reproducing images representing a picture or object, and, more particularly, but not necessarily exclusively, to novel apparatus for magnetically recording signals representing an image and to novel apparatus for reproducing the recorded image.

Preservation of a record of a broadcast television program is desirable. It is customary to obtain the record by photographing an image produced under control of the video signal generated for broadcast purposes. The film record so obtained is also available as a source of image signals for rebroadcast purposes. Direct motion picture photography of a performance designed for television entertainment is also used to obtain a motion picture film record of the performance. This film record can be cut and edited prior to its use as a program item in a television broadcast. The presently practical methods outlined above depend upon the use of photographic film which is relatively expensive and which requires expensive processing. Moreover, processing must be carried out in dark rooms or light-proofed containers with the aid of chemicals and chemical handling equipment.

In accordance with the present invention, television program records and also records to be edited for a television performance are obtained by novel magnetic recording methods and apparatus. The methods of magnetic recording of image signals generated by television scanning equipment suggested by the prior art have had a serious limitation imposed by reason of the impracticability of moving a recording magnetic medium at a velocity which is sufficiently high properly to record the image signals in a form available for satisfactory reproduction. In accordance with the present invention, novel arrangements are provided whereby the recording medium is moved at a reasonable speed both for recording and reproduction. This is accomplished in one form of the invention by employing novel electronic means for apportioning the recording effects over an extended area of the recording medium rather than along a single line. The linear velocity of the recording medium may, therefore, be kept desirably low. Preferably, a recording medium of given area is of appreciable length so that its width is convenient for handling and storage. In accordance with the invention it is possible to use a plurality of strands or wires for magnetic recording purposes although this is not preferred. The area spoken of will then be a geometrical abstraction as it is represented by the total number of wires and their spacing.

The invention has for its principal aim to provide novel means for recording and reproducing image signals magnetically.

Another object is to provide novel electronic means for apportioning the recording effects over an extended area of a magnetically sensitive recording medium.

A further object is to provide novel means for recording and/or reproducing image signals on a moving strip or web of magnetic material which employs a deflectable electron beam as the distributing means.

A still further object of the invention is to provide a novel assembly of magnetic recording and/or reproducing devices for scanning a magnetically sensitive sheet or web along closely adjacent parallel lines.

Other objects and advantages of the present invention will, of course, become apparent and immediately suggest themselves to those skilled in the art to which the invention is directed from a reading of the following specification in connection with the accompanying drawing in which.

Figures 1, 2, 3, 4, 5:
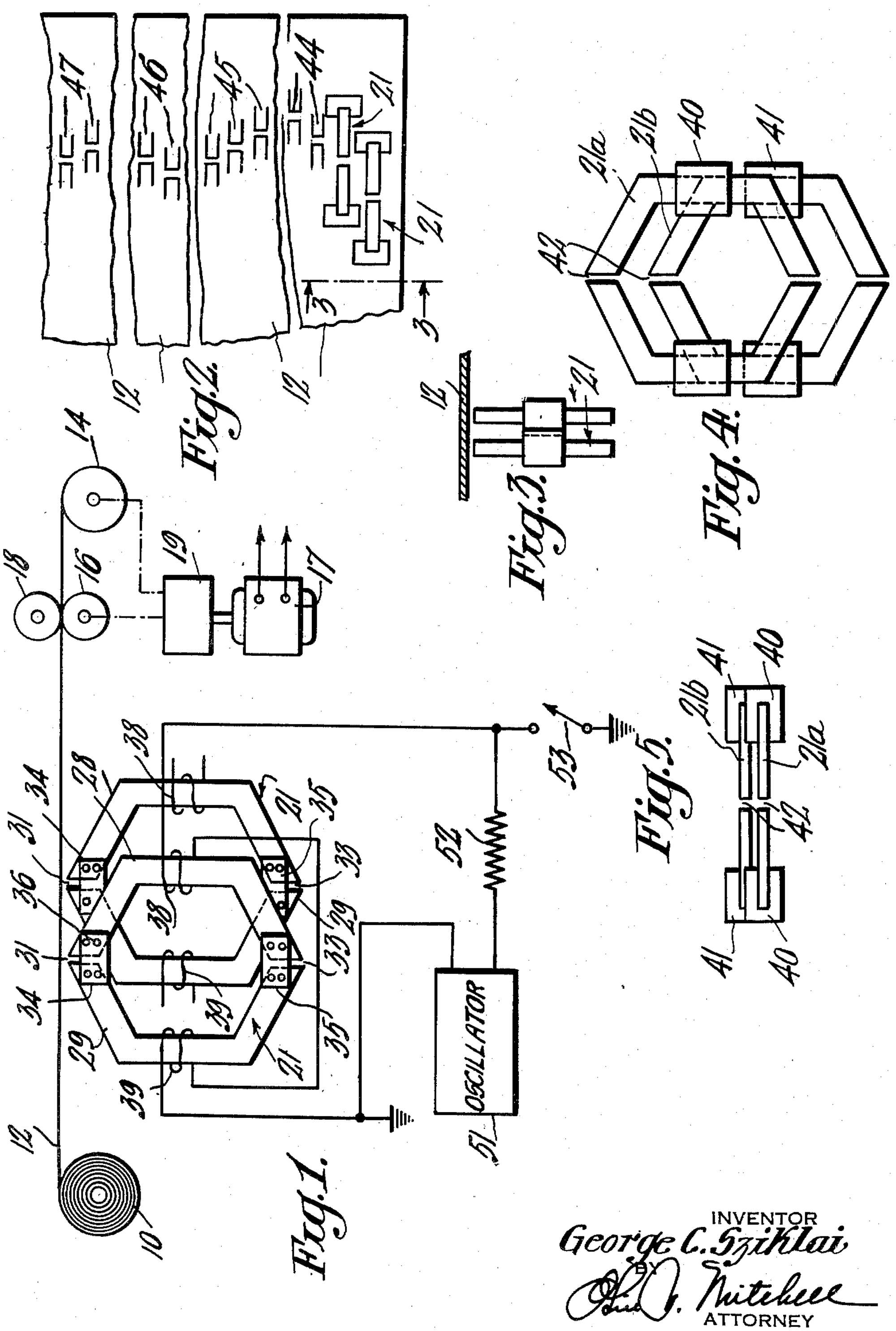
Fig. 1 is a schematic illustration of a recorder embodying features of the present invention.
Fig. 2 is a plan view showing schematically the disposition of a plurality of recording heads in the arrangement of Fig. 1.
Fig. 3 is a fragmentary sectional view of the arrangement of Fig. 2, the section being taken on line 3—3 as viewed in the direction of the arrows.
Figs. 4 and 5 are elevation and plan views respectively of two of a possible plurality of recording or pickup heads arranged according to a modification of the invention.

Fig. 1 of the drawing which shows the general arrangement of a recording system capable of operation in accordance with the invention, will be referred to in the general description of the invention which is to follow. There is conventionally shown a reel or the like 10 upon which is wound a quantity of a magnetically sensitive recording web 12. This web may suitably be made of paper coated or impregnated with any known magnetically sensitive material. It will be understood that the web 12 may be of metal but because of weight, bulk and cost of a metal web or tape, its use is not preferred. There is conventionally shown a takeup reel 14 upon which the tape 12 is wound as recording progresses. The tape 12 is shown schematically and conventionally as being propelled through the recording zone by a driving roller 16 and an idler roller 18. The takeup reel 14 and the driving roller 16 are suitably connected mechanically to a motor 17. The mechanical connection is indicated schematically as a gear drive mechanism or the like 19 which serves not only to couple the motor to the takeup driving mechanism but also to adjust the speed of the takeup reel 14 with respect to the driving roller 16 so that the tape may be driven at reasonably constant velocity. If there is a predictable variation in velocity or if the same or a similar mechanism is used for reproducing the recorded event or program, then variation in tape velocity is of minor importance. The motor 17 is of the type operating at constant speed and is preferably a synchronous motor. The motor speed is selected in accordance with the desired system characteristics, such as recording medium sensitivity and the response characteristics of the means utilized for producing the magnetic field relied upon for recording.

In accordance with present day television practice a television image is produced by a moving scanning spot which traverses a viewing field to create or produce a visual image. In accordance with present day television methods, a viewing field is scanned a plurality of times, twice for example, to produce interlaced frames. Complete television images are produced under current standards at a frame frequency at 30 per second and where multiple scanning is employed, for example, duplicate interlaced scanning, the scanning of each field occurs at twice this frequency. In the interlaced scanning system of television image transmission and reproduction, each complete excursion of the scanning means in either the video signal generator or the image producing device is ordinarily referred to as a "field" and two of these fields make up an image "frame." By way of example, and in accordance with present practice, the period of the initiating pulses for each field is $1/60$ of a second, nominally, which is the time required to scan one field. The complete cycle for a frame, including the blanking period at the end of each of two fields, is constituted by 525 horizontal lines. This means that the image of the original subject matter is analyzed into picture elements that form a horizontal line 15,750 times in a second. Thus, each picture element in one vertical line corresponds to a maximum frequency of less than 15,750 cycles. If two successive lines were dark and light, the frequency would be only one-half of the 15,750 cycles, but if the sequence is irregular some sideband spread may be created. A frequency of 15,750 cycles can be recorded and reproduced from a magnetically sensitive web, such for example as a magnetic paper tape, at a speed of 90 ft. per minute. This relatively low speed made possible by the invention, is identical with the 35 mm. motion picture film speed. Thus, considering a parallel recording of 40 lines per inch, for example, a 10 inch wide tape running at a velocity of 90 ft. per minute is capable of completely recording a 525 line double interlaced 30 frame per second image with 400 line horizontal resolution.

The distribution of image intelligence laterally of the web or tape 12 in accordance with the invention, so that the tape speed may be reasonably low as pointed out above, is accomplished in the illustrative embodiment by arranging a plurality of recording heads 21 laterally of the tape. The size of these heads is exaggerated in the accompanying drawing for the sake of convenience of illustration. The lateral dimensions of each head 21 will determine the number of heads which can be arranged across the width of the tape with their active pole tips, and the air gap between these tips, on a line perpendicular to the edge of the tape. Since the recording heads may be used as reproducing heads or pick up devices, the same thing is true of the arrangement for image reproduction shown illustratively in Fig. 7 of the drawing. Each recording head 21 is so constructed that it is narrow transversely of its air gap. Considering one of the heads shown in Figs. 1 to 3, it is composed of two magnetic members 28 and 29. One end of each member lies closely adjacent the corresponding end of the other member to provide the active air gap 31. The opposite ends of the members 28 and 29 also lie close together to provide a second air gap 33. Each of the members 28 and 29 is preferably composed of laminated magnetic material. In the illustrative arrangement each member is preferably composed of four laminations each being substantially .001 inch thick. The members may be held together with the correct gap spacing by narrow strips 34 and 35 of non-magnetic material such as brass. Suitable fastening means such as brass rivets 36 serve to connect the strips and the members 28 and 29 in fixed relationship. A coil 38 is wound on the member 28. This coil is preferably of fine wire so that its bulk is small. A similar coil 39 is wound on the member 29. By using fine wire, the total thickness of each head may be in the neighborhood of only .009 of an inch.

Since it is unnecessary to have the heads on a line perpendicular with the edge of the tape, they may be arranged in a zig-zag row as shown illustratively by Fig. 2 of the drawing. Only a few of the heads composing the row are shown for the sake of ease of illustration. Figs. 2 and 3 of the drawing indicate that the coils on each head partly overlap the coils of the adjacent heads in a transverse direction with respect to the tape. The total number of heads may be divided so that a series or row of heads progressing stepwise in a given direction, is or may be equal to the next set of heads progressing oppositely. Four of such rows or series of heads, designated by reference characters 44 to 47 are shown illustratively in Fig. 2 of the drawing. The heads in each row preferably have the same spacing and forward advance, but the spacing and distance of advance may be varied as shown on the drawing.

Figs. 4 and 5 of the drawings show a modified arrangement of the heads 21 so that they may be conveniently arranged along a row perpendicular to an edge of the web or tape 12. The heads shown as a pair in Figs. 4 and 5 are designated 21a and 21b. The head 21b is slightly longer than the head 21a so that the coils 41 on the head 21b may be displaced vertically with respect to the coils 40 on the head 21a. The extra length of iron may be readily compensated by a filler (not shown) such as paper in the air gap 42 of the head having the shorter magnetic structure. It will be understood that heads 21a may alternate with heads 21b across the tape.

The manner in which the recorded intelligence is applied to the tape 12 (not shown in Fig. 6) so that the area of the tape is employed rather than a single line thereon will now be described with reference to Figs. 1 and 6 of the drawing. An alternating current generator, shown schematically as an oscillator 51 is connected in series with the coils 38 and 39 of each head 21. A resistor 52 is included in the series circuit for each head. This resistor offers an adequately high impedance for the signal to be applied. One terminal of the oscillator 51 is connected to a point of fixed potential such as ground. If the free end of the resistor 52 is connected to ground through a variable impedance the flux in the gap 31 of the head 21 will change in proportion to the change in impedance. In Fig. 1, the signal input is shown symbolically as a switch 53.

In accordance with the invention in a preferred form, an electron beam not only provides such an impedance but also serves as a switching means to apply intelligence progressively and rapidly along the lines 44 to 47 of the heads 21.

Figures 6, 7:
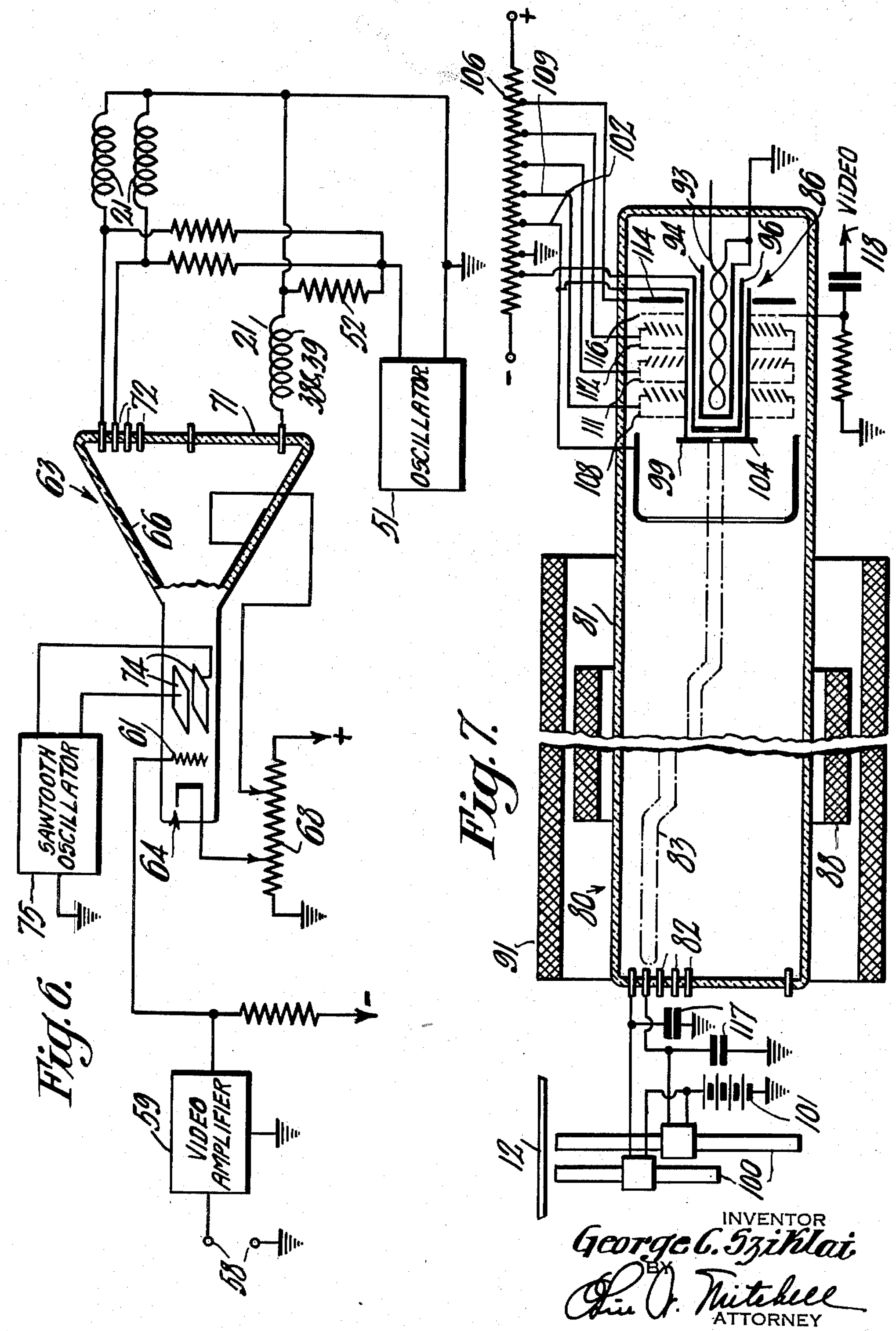
Fig. 6 is a diagrammatic showing of a plurality of recording heads and the electronic switching means to provide operation of the system in accordance with this invention.
Fig. 7 is a diagrammatic showing of a reproducing system arranged for operation in accordance with this invention.

In the preferred form shown schematically by Fig. 6, a video signal which is originated in any suitable way, such as television studio camera, is applied in rapid succession to the individual recording heads comprising the rows 44 to 47 by an electronic commutating system. The video signal is applied to terminals indicated schematically at 58 and it is amplified if desirable or necessary in a video amplifier 59. The output from the amplifier 59 is applied to the grid 61 of a special cathode ray tube 63 which is provided with an electron gun structure 64. The tube has the usual electrodes (not shown) for focusing a beam from the gun structure 64. The usual second anode is indicated by reference character 66 and it is connected to a point of high positive potential indicated schematically as a potentiometer 68. The end 71 of the tube is provided with embedded parallel conductors 72 which may be in the form of wires fused into or otherwise carried by the tube end 71. There is one conductor 72 for each of the recording heads 21 which are disposed in the rows 45 to 47 as indicated in Fig. 2 of the drawings. The tube 63 is provided with means for producing deflection of the beam from the gun structure 64 at the line frequency rate of scanning. In the illustrative example this deflection means is shown as a pair of electrostatic deflection plates 74 connected to a sawtooth wave generator 75 operating at the line scanning frequency rate. In the illustrative example this is assumed to be the present standard frequency of 15,750 cycles. It will be understood that electromagnetic deflection means may be employed if desired. As viewed in Fig. 6 the beam during deflection traverses a plane parallel to the plane of the drawing and sweeps successively over the metallic members 72. The tape 12 of Figs. 1 and 2 passes over the active air gaps of the heads 21. The instantaneous beam current to a conductor 72 shunts the magnetic head 21 associated with the particular member 72 upon which the beam is incident at a given moment. This shunting effect is proportional to the video signal at that time. During one scan of the beam, in accordance with the arrangement described, one line of the image is recorded on the tape 12. The structure of the tube 63 may be such as to provide a beam of considerable length perpendicular to the scanning path across the members 72 in order to lower the shunting impedance.

The tube 63 may be constructed as shown in Patent No. 2,449,339, granted September 14, 1948, so that the image will be utilized directly for controlling an electron beam sheet corresponding simultaneously to the picture content of a whole line.

Fig. 7 of the drawing shows a reproducing arrangement in accordance with the invention. Referring to Fig. 7, there is shown a tube 80 which is similar, for example, to the high sensitivity low beam velocity type tube known as the "Orthicon." The tube 80 having the structure shown herein by way of example is generally of the type disclosed and claimed in Patent No. 2,433,941, granted January 6, 1948. The tube 80, like the tube 63, includes an insulating end wall which may be the end wall of the glass envelope 81. This end wall is provided with a row of metallic inserts 82 similar to the inserts 72 in the end wall 71 of the tube 63 of Fig. 6. These inserts are scanned by a low velocity electron beam 83, produced by an electron gun 86. This organization of parts together with beam deflecting means of the combined electrostatic and electromagnetic type and a focusing coil are fully described in the patent above referred to, and only those portions of the tube 80 which are necessary to a complete understanding of the invention will be described in detail herein. For the sake of completeness of illustration, Fig. 7 includes a schematic showing of a magnetic deflection yoke 88 having a horizontal deflection coil. Also, a focusing coil 91 is shown.

The assembly of electrodes constituting the electron gun 86 includes a heater 93 and a cathode 94 from which electrons may be drawn; a control electrode or grid 96; and a first anode 99. The grid 96 is suitably biased by biasing means (not shown), and the first anode 99 is connected to a source of positive high potential 102.

The tube 80 preferably, but not necessarily, includes an electron multiplier means such as is shown in Patent No. 2,433,941, referred to above. In the illustrative means, the first anode 99 acts as the first multiplier and is shaped as indicated at 104 to perform this function.

Suitable biasing voltages are provided for the elements of the tube 80, and, by way of example and for the sake of illustration, a potentiometer 106 is shown as providing biasing voltages. The function of each individual element is fully discussed in the above noted Weimer patent together with examples of suggested voltage values, to be applied to the elements. Only those tube elements directly concerned in the description of the present invention have been or will be discussed herein, it being remembered that tube 80 is shown by way of example.

Each insert 82 is connected to an individual reproducing or pickup head 100 through a circuit including a biasing source shown in the illustrative example as the battery 101. Electrons in the beam 83, directed toward inserts 82 in the tube face which are positive, will be collected by these inserts whereas electrons approaching inserts corresponding to a given predetermined magnetic condition of a given portion of the area of the tape will be deflected and will reach the first anode 99 which also serves as a first multiplier. Those electrons impinging on the portion 104 of the first anode 99 release a great number of secondary electrons which are drawn toward the second multiplier 108. This second multiplier 108 is connected to a source 109 which is positive with respect to the source 102. The energy is similarly multiplied at the third, fourth, and fifth multipliers 111, 112 and 114 and the released electrons impinge upon a collector element 116. In normal operation of the tube 80, the image signal is taken from the collector 116 and is fed to a video pre-amplifier (not shown) from a connection indicated schematically at 118.

Each insert 82 in the tube 80 has a capacitance 117 corresponding to a time constant of approximately 15,000 cycles per second in the illustrative example. As the signal from a given magnetic head charges the target inserts 82 to various potentials, the unidirectional scanning beam will be reflected or absorbed by the inserts 82 in various degrees depending upon the instantaneous value of the image signal. The reflected portion of the beam ultimately reaching the collector 116 thus carries a modulation corresponding to the original image content. If the scanning is synchronous with the recorded scanning the returned beam current will correspond to the original video signal.

The tape 12 is drawn in any suitable manner along the reproduced or pickup heads 100. Apparatus for doing this may be constructed as shown in Fig. 1 of the drawings.

What is claimed is:

1. A signal recording system comprising means for moving a recording medium of substantial width in a predetermined direction, a plurality of recording devices, means to position said devices substantially parallel to each other and progressively at an angle to the direction of movement of the recording medium for cooperation with the recording medium, an image signal source, and an electronic distributor for progressively distributing the image signal from said source to said devices whereby to distribute a record of said image signal in accordance with a predetermined pattern over at least a portion of the area of said recording medium.

2. A signal recording system comprising means for moving a recording medium sensitive to a field strength variation in a predetermined direction, a plurality of separate recording devices responsive to a circuit having a variable impedance distributed transversely of the direction of movement of the recording medium for cooperation with the recording medium, a signal source, and a distributor having means including circuits for providing a variable impedance effect, said distributor having a progressively movable variable impedance means for progressively distributing the signal derived from said source to said devices whereby to distribute a record of said signal over at least a portion of the area of said recording medium.

3. A signal recording system comprising means for moving a recording medium of substantial width and sensitive to field strength variations in a predetermined direction, a plurality of recording devices, means to position said devices transversely of the direction of movement of the recording medium for cooperation with the recording medium, each device having a circuit connected thereto, each circuit having means to accommodate an interposed variable impedance in the form of a modulated cathode ray beam, a signal source, a cathode ray tube, means to provide one component of deflection for the beam in said tube, means to modulate the beam in said tube by the signal derived from said source, and means to progressively connect said modulated beam as a variable impedance in said circuits for said devices.

4. A signal recording system comprising means for moving a field strength sensitive recording medium of substantial width in a predetermined direction, a plurality of recording devices, each device having means to produce a field capable of storing a record in said recording medium, an electrical circuit for controlling the strength of said field, a source of image signals, a commutating device comprising means for producing a beam of electrons, means to cause deflection of said beam, means to modulate said beam by said image signals, and means to couple said beam progressively as it is deflected to said electrical circuits.

5. A signal recording system comprising means for moving a magnetic recording medium of substantial width in a predetermined direction, a plurality of recording devices, each device presenting an electrical impedance, a source of image signals, a commutating device comprising means for producing a beam of electrons, means to cause deflection of said beam, means to modulate said beam by said image signals, and means to couple said beam progressively as it is deflected to said electrical impedances.

6. A signal recording and reproducing system comprising means for moving a recording medium of substantial width in a predetermined direction, a plurality of recording devices, each device presenting an electrical impedance, a source of image signals, a commutating device comprising means for producing a beam of electrons, means to cause deflection of said beam, means to modulate said beam by said image signals, means to couple said beam progressively as it is deflected to said electrical impedances, and a plurality of pickup devices, each of said devices having means to produce a voltage in response to the presence of said recording medium following a recording operation, a reproducing commutating device comprising means for producing a beam of electrons, means to cause deflection of said beam, means to modulate said beam by the voltages produced by said devices, and means to obtain a replica of the recorded image signals from said beam.

7. A signal recording system comprising means for moving a magnetic recording medium of substantial width in a predetermined direction, a plurality of recording devices, each device including an electrical circuit, an alternating current generator in each circuit, a source of image signals, a commutating device comprising an electrical path, means to cause the conductivity of said path to vary in proportion to said image signals, said electrical path to be successively connected across said alternating current generator.

8. A signal recording system comprising means for moving a magnetic recording medium of substantial width in a predetermined direction, a plurality of magnetic recording devices, each device having an electrical circuit, an alternating current generator in each circuit, a source of image signals, a cathode ray tube serving as a commutating device, said tube comprising means for projecting a cathode ray beam, said tube having a plurality of conductive members sealed therein and exposed externally of said tube, means to deflect said beam periodically in a given direction, said conductors being arranged successively along the path of said beam, means for modulating said beam in accordance with image signals derived from said source, and means for connecting said beam substantially in parallel with the output of said alternating current generator.

9. A signal reproducing system comprising means for moving a recording medium in a predetermined direction, a plurality of pickup devices, each device including means for generating a voltage, a cathode ray tube serving as a commutating device, said tube comprising means for projecting and focusing a cathode ray beam, said tube having a plurality of conductive members sealed therein and exposed externally of said tube, means to deflect said beam periodically in a given direction, said conductors being arranged successively along the path of said beam whereby the voltages derived from said pickups modulate said beam in accordance with signals stored in said recording medium, and means for deriving signals from said modulated beam.

10. A signal reproducing system comprising means for moving a magnetic recording tape in a predetermined direction, a plurality of magnetic pickup devices, each device including a coil linked with the magnetic circuit of the device, a cathode ray tube serving as a commutating device, said tube comprising means for projecting and returning a low velocity cathode ray beam, said tube having a plurality of conductive members sealed therein and exposed externally of said tube, means to deflect said beam periodically in a given direction, said conductors being arranged successively along the path of said beam, connections from said coils to said conductors whereby said beam is modulated in accordance with image signals stored by said tape, and means upon which the returned beam impinges to provide signals representative of signals stored by said tape.

GEORGE C. SZIKLAI.

REFERENCES CITED

The following references are of record in the file of this patent:

UNITED STATES PATENTS

| Number | Name | Date |
|---|---|---|
| 1,771,360 | Thurm | July 22, 1930 |
| 1,771,820 | Rtcheouloff | July 29, 1930 |
| 1,934,753 | Wildhaber | Nov. 14, 1933 |
| 1,974,911 | Buecker et al. | Sept. 25, 1934 |
| 2,058,898 | Mathes | Oct. 27, 1936 |
| 2,229,326 | Heller | Jan. 21, 1941 |
| 2,283,148 | Bruce | May 12, 1942 |
| 2,291,476 | Kernkamp | July 28, 1942 |
| 2,294,180 | Heising | Aug. 25, 1942 |